United States Patent
Halliop et al.

(10) Patent No.: US 7,226,679 B2
(45) Date of Patent: Jun. 5, 2007

(54) FUEL CELL SYSTEM WITH DEGRADATION PROTECTED ANODE

(75) Inventors: Wojtek Halliop, Ontario (CA); Gordon M McAlary, Ontario (CA); Raymond A George, Pittsburgh, PA (US)

(73) Assignees: Siemens Power Generation, Inc., Orlando, FL (US); Fuel Cell Technologies, Ltd, Ontario (CA)

( * ) Notice: Subject to any disclaimer, the term of this patent is extended or adjusted under 35 U.S.C. 154(b) by 496 days.

(21) Appl. No.: 10/627,969

(22) Filed: Jul. 28, 2003

(65) Prior Publication Data

US 2004/0106019 A1 Jun. 3, 2004

(51) Int. Cl.
H01M 8/12 (2006.01)
H01M 8/00 (2006.01)
H91M 8/10 (2006.01)

(52) U.S. Cl. ............... 429/24; 429/13; 429/26; 429/30

(58) Field of Classification Search ........ 429/13, 429/26, 24, 30
See application file for complete search history.

(56) References Cited

U.S. PATENT DOCUMENTS

| | | | |
|---|---|---|---|
| 4,537,839 A | 8/1985 | Cameron | 429/20 |
| 4,670,359 A | 6/1987 | Beshty et al. | 429/17 |
| 4,684,581 A | 8/1987 | Struthers | 429/19 |
| 4,702,971 A | 10/1987 | Isenberg | 429/31 |
| 5,143,800 A | 9/1992 | George et al. | 429/20 |
| 5,306,574 A | 4/1994 | Singh et al. | 429/13 |
| 5,401,589 A | 3/1995 | Palmer et al. | 429/13 |
| 5,413,879 A | 5/1995 | Domeracki et al. | 429/30 |
| 5,541,014 A | 7/1996 | Micheli et al. | 429/19 |
| 5,573,867 A | 11/1996 | Zafred et al. | 429/17 |
| 5,595,833 A | 1/1997 | Gardner et al. | 429/19 |

(Continued)

FOREIGN PATENT DOCUMENTS

CA 2293898 1/2000

(Continued)

OTHER PUBLICATIONS

Patent Abstracts of Japan vol. 013 No. 132 (E736) Mar. 31, 1989.

(Continued)

*Primary Examiner*—Patrick Joseph Ryan
*Assistant Examiner*—Thomas H. Parsons
(74) *Attorney, Agent, or Firm*—Ohlandt, Greeley, Ruggiero & Perle L.L.P.

(57) ABSTRACT

A method of operating a fuel cell including an anode, a cathode, a first passage, and a second passage, wherein the anode is disposed in the first passage and the cathode in the second passage including producing a non-explosive gaseous feed consisting of (i) at least one oxidizable component having a greater tendency to undergo oxidation relative to the anode, and (ii) a remainder which is the predominant component in the gaseous feed consisting essentially of water vapor; and introducing the non-explosive gaseous feed to the first passage to form a first gaseous feed stream flowing through the first passage when the anode realizes a temperature effective to facilitate deteriorative oxidation of the anode in the presence of an oxidizing agent. The non-explosive gaseous feed is provided to mitigate or prevent anode oxidation and the formation of potentially explosive gaseous mixtures.

32 Claims, 2 Drawing Sheets

U.S. PATENT DOCUMENTS

| | | | |
|---|---|---|---|
| 5,714,276 A | 2/1998 | Okamoto | 429/17 |
| 5,813,222 A | 9/1998 | Appleby | 60/274 |
| 5,820,654 A | 10/1998 | Gottzman et al. | 95/54 |
| 5,837,125 A | 11/1998 | Prasad et al. | 205/763 |
| 5,868,117 A | 2/1999 | Moote et al. | 123/486 |
| 5,928,805 A | 7/1999 | Singh et al. | 429/13 |
| 5,953,908 A | 9/1999 | Appleby | 60/275 |
| 5,964,089 A | 10/1999 | Murphy et al. | 60/286 |
| 5,981,096 A | 11/1999 | Hornburg et al. | 429/17 |
| 6,017,646 A | 1/2000 | Prasad et al. | 429/13 |
| 6,036,827 A | 3/2000 | Andrews et al. | 204/252 |
| 6,045,933 A | 4/2000 | Okamoto | 429/17 |
| 6,053,266 A | 4/2000 | Greenhill et al. | 180/65.3 |
| 6,068,941 A | 5/2000 | Fuller et al. | 429/13 |
| 6,122,909 A | 9/2000 | Murphy et al. | 60/286 |
| 6,210,821 B1 | 4/2001 | Lesieur et al. | 429/17 |
| 6,223,844 B1 | 5/2001 | Greenhill et al. | 180/65.3 |
| 6,232,005 B1 | 5/2001 | Pettit | 429/19 |
| 6,235,254 B1 | 5/2001 | Murphy et al. | 423/212 |
| 6,242,120 B1 | 6/2001 | Herron | 429/22 |
| 6,268,074 B1 | 7/2001 | Siepierski et al. | 429/13 |

FOREIGN PATENT DOCUMENTS

| | | |
|---|---|---|
| GB | 2158287 A | 4/1985 |
| GB | 2 158 287 | 11/1985 |
| JP | 63 298974 | 12/1988 |
| JP | 63298974 | 12/1988 |
| JP | 03043965 | 2/1991 |
| JP | 07029586 | 1/1995 |
| JP | 07169493 | 7/1995 |

OTHER PUBLICATIONS

International Preliminary Examination Report and Written Opinion corresponding to PCT International Application PCT/CA03/01126.

FUEL CELL SYSTEM WITH DEGRADATION PROTECTED ANODE

FIELD OF INVENTION

This invention relates to fuel cell systems, and particularly to solid oxide fuel cells with systems configured to mitigate deleterious oxidation of fuel cell components.

BACKGROUND OF THE INVENTION

Solid oxide fuel cells typically operate at high temperature conditions. Because of these temperature conditions, solid oxide fuel cells typically require a supply of purge gas during various stages of operation. During start-up and shutdown of a solid oxide fuel cell, it is preferable not to flow gaseous fuel through a fuel cell, as it is potentially explosive at these lower temperatures. However, without the maintenance of a reducing environment in the region of the anode, the anode may be susceptible to oxidation, thereby compromising electrochemical performance and/or service life of the fuel cell. As such, during start-up and shut down conditions, it is not only important to avoid exposure of solid oxide fuel cell components to an atmosphere which is oxidizing, but it is also important to prevent their exposure to a potentially explosive atmosphere.

To mitigate these conditions, purge gas systems have been developed to supply solid oxide fuel cells with purge gas during start-up and shutdown conditions. An example of such a system is described in U.S. Pat. No. 5,928,805 issued to Singh et al. In Singh et al., the purge gas is generated by combusting a hydrocarbon fuel in the presence of air to generate a non-explosive mixture of combustion products, to which stored hydrogen is selectively added to maintain the desired hydrogen concentration in the final gas stream entering the solid oxide fuel cell. To generate the desired cover gas composition in this case, the flow of reactants entering the burner must be carefully controlled in order to form a combustion product whose hydrogen content is able to be attenuated to a desired level by selective addition of hydrogen from a separate supply source.

SUMMARY OF THE INVENTION

The present invention provides a method of operating a solid oxide fuel cell with a first gaseous fluid comprising water vapor and at least one oxidizable component characterized by a greater tendency to undergo oxidation relative to the anode.

In one aspect, the present invention provides a method of operating a fuel cell including an anode, a cathode, a first passage, and a second passage, wherein the anode is disposed in the first passage and the cathode is disposed in the second passage, comprising: producing a non-explosive gaseous feed consisting of at least one oxidizable component having a greater tendency to undergo oxidation relative to the anode, and a remainder, wherein the remainder is the predominant component in the gaseous feed and consists essentially of water vapor, and introducing the non-explosive gaseous feed to the first passage to form a first gaseous stream flowing through the first passage when the anode realizes a temperature effective to facilitate deteriorative oxidation of the anode in the presence of an oxidizing agent.

The concentration of the water vapor in the gaseous feed may be greater than 50% by volume based on the total volume of the gaseous feed. The concentration of the at least one oxidizable component is less than the minimum concentration necessary to render the gaseous feed potentially explosive at the effective temperature. In this respect, the concentration of the at least one oxidizable component may be less than the lower flammability limit of the at least one oxidizable component. The concentration of the at least one oxidizable component may be effective to mitigate, or substantially prevent, deteriorative oxidation of the anode. The at least one oxidizable component may be selected from the group consisting of hydrogen, alcohols, aldehydes, ketones, ammonia, hydrazine, and hydrocarbons. The method may further comprise evaporating an aqueous mixture consisting essentially of water and at least one oxidizable component to produce the gaseous feed. The anode may comprise nickel. Where the anode comprises nickel, the temperature effective to facilitate deteriorative oxidation of the anode is greater than or equal to 400° C. The method may further comprise flowing a second gaseous stream through the second passage, the second gaseous stream including oxygen, while contemporaneously flowing the first gaseous stream through the first passage. The at least one oxidizable component may be methanol, and the concentration of methanol in the aqueous solution may be less than about 2.4% by weight based on the total weight of the aqueous solution. It is understood that, in the typical case the temperature effective to facilitate deteriorative oxidation of the anode is much higher than the boiling temperature of water, therefore the purge gas mixture can be safely supplied to the fuel cell without the danger of steam condensation deleteriously affecting its operation.

In another aspect, the present invention provides a method of operating a fuel cell including an anode, a cathode, a first passage, and a second passage, wherein the anode is disposed in the first passage and the cathode is disposed in the second passage, comprising:
  (i) progressively heating the first passage;
  (ii) producing a non-explosive gaseous feed consisting of at least one oxidizable component having a greater tendency to undergo oxidation relative to the anode, and a remainder, wherein the remainder is the predominant component in the gaseous feed and consists essentially of water vapor; and
  (iii) purging the first passage with the gaseous feed when the temperature of the anode is above a temperature effective to cause deteriorative oxidation of the anode in the presence of an oxidizing agent.

In a further aspect, the present invention provides a method for operating a fuel cell including an anode, comprising nickel, a cathode, a first passage, and a second passage, wherein the anode is disposed in the first passage and the cathode is disposed in the second passage, comprising: producing a non-explosive gaseous feed comprising water vapor and at least one oxidizable component having a greater tendency to undergo oxidation relative to the anode by either of (a) evaporating an aqueous mixture comprising the at least one oxidizable component, or (b) evaporating a source of water to produce the water vapor, and combining the water vapor with the at least one oxidizable component. The evaporation may be a flash evaporation. When the temperature within the first passage is sufficiently high such that the gaseous fuel is not potentially explosive when disclosed in the first passage, the purging of the first passage by the gaseous feed may be terminated and a gaseous fuel can then be flowed through the first passage.

In a further aspect, the present invention provides a fuel cell system comprising: a fuel cell including an anode, a cathode, a first passage, and a second passage, wherein the anode is disposed in the first passage and the cathode is disposed in the second passage; means for evaporating an aqueous mixture including at least one oxidizable component to form a gaseous feed, and means for delivering the gaseous feed to the first passage to form a first gaseous stream flowing through the first passage and effective in mitigating corrosion of the anode.

In yet another aspect, the present invention provides a fuel cell system comprising a fuel cell including an anode, a cathode, a first passage, and a second passage, wherein the anode is disposed in the first passage and the cathode is disposed in the second passage, an evaporator for a fuel cell system comprising: a fuel cell including an anode, a cathode, a first passage, and a second passage, wherein the anode is disposed in the first passage and the cathode is disposed in the second passage: an evaporator, fluidly communicating with the first passage, and configured to evaporate an aqueous mixture including at least one oxidizable component to form a gaseous feed, and a controller, communicating with the fuel cell for receiving an anode corrosion indication, for effecting delivery of the gaseous feed to the first passage to form a first gaseous stream flowing through the first passage in response to the anode corrosion indication within the fuel cell.

In one aspect, the controller is coupled to a temperature sensor for measuring a temperature within the fuel cell, wherein the controller is configured to effect the delivery of the gaseous feed at a predetermined temperature. The controller may also be coupled to a motive means configured to effect the delivery of the gaseous feed, wherein the controller is configured to actuate the motive means to effect the delivery of the gaseous feed at a predetermined temperature.

BRIEF DESCRIPTION OF THE DRAWINGS

This invention will be better understood by reference to the following detailed description of the invention in conjunction with the following drawings, in which.

DETAILED DESCRIPTION

Figure 1:
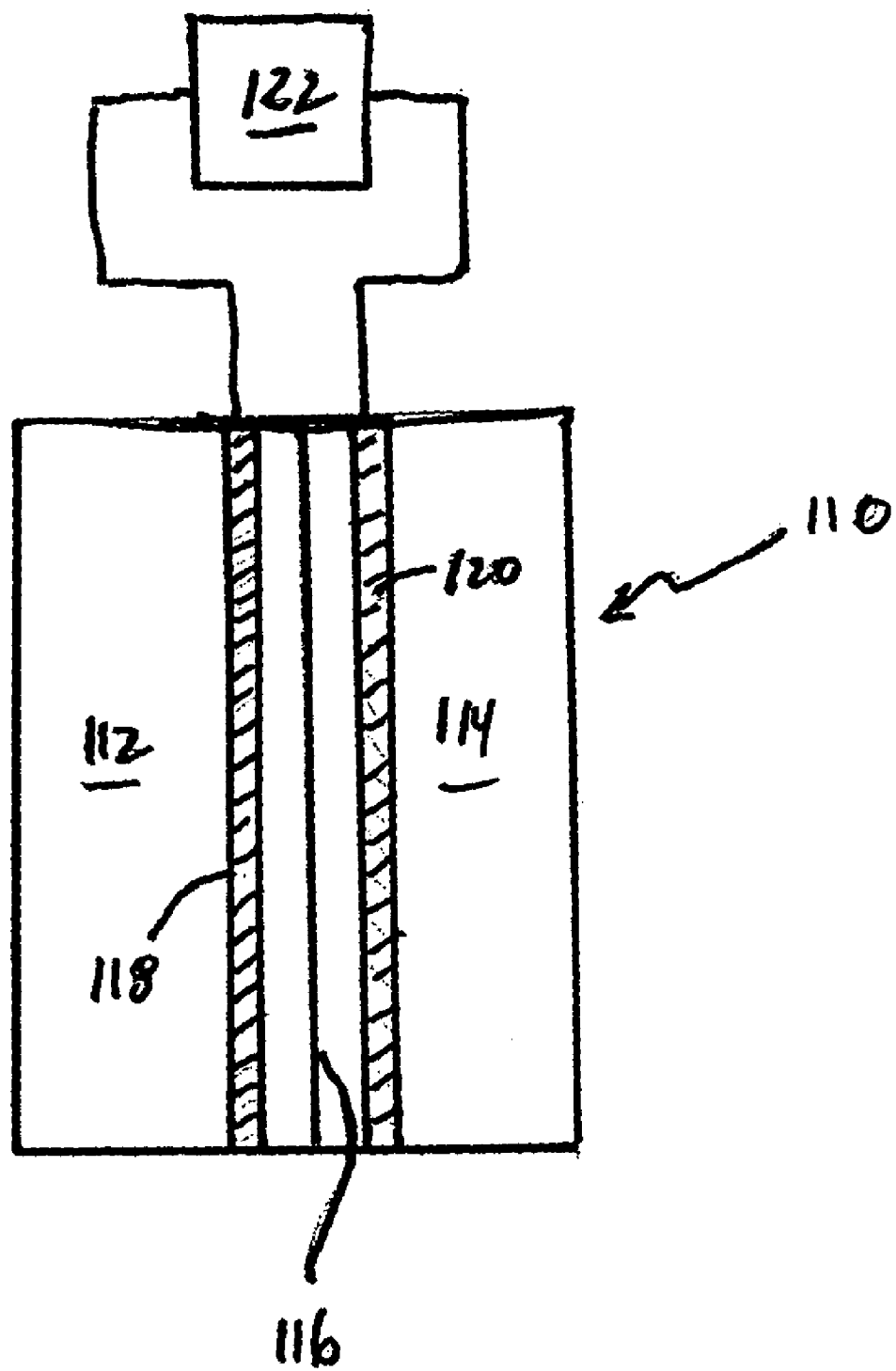
FIG. 1 is a schematic illustration of a fuel cell.

Referring to FIG. 1, a solid oxide fuel cell 110 includes a first passage 112 and a second passage 114. The first passage 112 is separated from the second passage 114 by a substantially ionically conducting separator 116 to permit selective permeation of ionic species therethrough. The term "substantially ionically conducting" recognizes that the separator 116 conducts electricity to a small degree but not to the extent where it significantly impacts on performance of the fuel cell 110 (due to the fact that the conductance of electrons through the separator 116 short-circuits the electrodes 118, 120, described below). An anode 118 is disposed in the first passage 112, and a cathode 120 is disposed in the second passage 114. Each of the anode 118 and the cathode 120 is disposed in intimate contact with the separator 116 for facilitating migration of ionic species. Each of the anode 118 and the cathode 120 is also electrically connected to an external load 122, thereby facilitating the conductance of electrons between the electrodes and to an external load 122.

Gaseous fuel is flowed through the first passage 112. An oxidant characterized by a greater tendency to undergo reduction relative to the gaseous fuel is flowed through the second passage 114. The fuel is oxidized at the anode 118, and the oxidant is reduced at the cathode 120. An example of a suitable solid oxide fuel cell of the "tubular" variety is disclosed in U.S. Pat. No. 4,395,468. It is understood that solid oxide fuel cells of the "planar" or other varieties, or other high temperature fuel cells, fall within the scope of this invention.

To mitigate corrosion of components within a fuel cell, while preventing the creation of a potentially explosive environment, the present invention provides a method of operating a fuel cell. The method comprises producing a non-explosive gaseous feed and introducing the gaseous feed to the first passage to form a first gaseous stream flowing through the first passage. Gaseous feed can be introduced to the first passage to form a first gaseous stream flowing through the first passage for the purpose of removing and replacing a gaseous volume within the first passage. In such case, the introduction of the gaseous feed to the first passage for this purpose is referred to as "purging" of the first passage. Purging of the first passage can be effected to remove undesirable gaseous substances, such as those substances whose presence in the first passage could increase the risk of formation of an explosive mixture within the first passage during the operation of the fuel cell. Purging of the first passage can be effected during start-up or shutdown of the fuel cell. During start-up, the first passage is purged of air. During shutdown, the first passage is purged of fuel.

The gaseous feed consists of (i) at least one oxidizable component having a greater tendency to undergo oxidation relative to the anode, and (ii) a remainder. The remainder is the predominant component in the gaseous feed. Being the predominant component means that the majority of the volume of the gaseous feed consists of the remainder. The concentration of the at least one oxidizable component of the gaseous feed is outside the concentration necessary to render the gaseous feed, or the first gaseous stream, potentially explosive at the effective temperature. In this respect, the gaseous feed is non-explosive.

Upon the anode realizing a temperature effective to facilitate deteriorative oxidation of the anode in the presence of an oxidizing agent (the "effective temperature"), a reducing atmosphere, relative to the anode, is required in the first passage. From a thermodynamic perspective, at temperatures lower than this effective temperature, the anode is susceptible to oxidation by an oxidizing agent, such as air, but at an acceptably low reaction rate. The rate of oxidation, however, increases with temperature. At the effective temperature, the rate of oxidation is unacceptably high and leads to structural deterioration of the anode to the point where electrochemical performance and/or service life of the fuel cell is compromised, and is what is referred to herein as "deteriorative oxidation".

In one embodiment, the anode comprises nickel, and the effective temperature at which deteriorative oxidation of the anode and/or its components becomes of concern is tied to the susceptibility of nickel to deteriorative oxidation. In the presence of oxygen or other oxidizing agents, and at temperatures above 400° C., nickel is susceptible to unacceptably high rates of oxidation. From a thermodynamic perspective, nickel is susceptible to oxidation by air at any temperature, but the reaction rate is very low at low temperatures. The oxidation rate increases with temperature. Usually an oxide film forms on the surface that slows down further oxidation or brings it nearly to zero, and bulk nickel does not get easily oxidized up to a relatively high temperature. In a solid oxide fuel cell anode, nickel is usually present in a form of very small particles dispersed in a porous ceramic matrix, such as yttria stabilized zirconia. As the surface area of nickel is very high, and access thereto by oxygen is relatively good, the sensitivity of nickel to oxidation is relatively high. Oxidation converts nickel to less dense nickel oxides (primarily NiO), thereby creating space demands and creating stresses in the structure up to the point of disintegration. This phenomenon becomes more pronounced at higher temperatures and results in deteriorative oxidation. However, there is no clear temperature above which nickel must be protected from, as this may depend on the particular form of nickel, the overall composition of the anode and the duration of exposure. Providing a reducing environment, relative to nickel, in the first passage at a temperature of 400° C. is prudent for most circumstances, but depending on the particular conditions, a higher starting temperature may be selected. A lower starting temperature may be necessary for a fuel cell that uses pure oxygen or operates at a relatively high pressure.

To create the desired reducing atmosphere at the effective temperature, the gaseous feed is introduced to the first passage to form a first gaseous stream flowing through the first passage. The gaseous feed consists of at least one oxidizable component and a remainder, wherein the remainder consists essentially of water vapor. The at least one oxidizable component is defined as a compound having a greater tendency to undergo oxidation relative to the anode. In this respect, the oxidizable component in the gaseous feed is more likely to be oxidized in the presence of an oxidizing agent, relative to the anode or any component of the anode, such as one or more components of the surface of the anode. Conversely, a non-oxidizable component in the gaseous feed is less likely, or as likely, to be oxidized in the presence of an oxidizing agent, relative to the anode or any component of the anode, such as one or more components of the surface of the anode. The term "oxidizing agent" refers to a compound that has a greater tendency to undergo reduction, relative to the anode or any component of the anode, such as one or more components of the surface of the anode.

For example, where the anode comprises nickel, suitable oxidizable components include hydrogen, alcohols, aldehydes, ketones, ammonia, hydrazine, esters, organic acids, suitable hydrocarbons, and, in general, any organic compound that can be substantially converted to oxidizable gaseous products during evaporation of their aqueous mixtures and/or subsequent reactions as the suitable oxidizable components and its reaction product(s) are delivered to the fuel cell 110 and flow through the fuel cell 110. Any of these suitable oxidizable components must be compatible with fuel cell operation (e.g. no deleterious sulphur content) and must have a greater thermodynamic tendency to undergo oxidation, in the presence of oxygen or any other oxidizing agent, than nickel. Nickel is commonly incorporated in solid oxide fuel cell anodes.

In one embodiment, the at least one oxidizable component (including one or more of such oxidizable components) is present in a concentration effective to mitigate deteriorative oxidation of the anode. An inadequate concentration of the at least one oxidizable component may be insufficient to mitigate deteriorative oxidation of the anode where an oxidant is present in the environment immediate to the anode. Deteriorative oxidation of the anode includes reference to the oxidation of one or more components of the anode surface that impacts the performance or service life of the fuel cell. In one embodiment, one anode surface component is nickel. Mitigation of deteriorative oxidation includes reference to reducing the rate of deteriorative oxidation relative to the condition where no gaseous stream is flowed through the first passage, and the anode is exposed to an atmosphere including an oxidizing agent. The rate of deteriorative oxidation is reduced by introducing the gaseous feed to the first passage, and thereby introducing the at least one oxidizable component to the first passage. Upon introduction to the first passage, the at least one oxidizable component and/or its reaction products are exposed to the anode, and thereby contribute to the creation of a reducing atmosphere relative to the anode. The reaction products include those resulting from steam reformation and/or thermal decomposition of the at least one oxidizable component while the gaseous feed is being introduced to the first passage, and as the at least one oxidizable component, and/or the reaction products created during the introduction, flows through the first passage as part of the first gaseous stream.

In another embodiment, the at least one oxidizable component is present in a concentration effective to substantially prevent deteriorative oxidation. In practical terms, the deteriorative oxidation of the anode is substantially prevented if the corrosion negligibly impacts on the electrochemical performance or the service life of the fuel cell.

The at least one oxidizable component enjoys a lower oxidation potential than does the anode, or any of the components of the anode. Oxidation potential is defined as the tendency of a substance to accept electrons. In general, it can be quantified as an electrical potential of an inert metallic electrode in equilibrium with both the reduced and oxidized forms of the substance, measured with reference to a standard electrode. It is a measure of the tendency of a particular compound to be reduced, or the tendency to oxidize other substances. A compound characterized by a lower oxidation potential is more likely to be oxidized versus compounds characterized by higher oxidation potentials.

As mentioned above, the remainder of the gaseous feed consists essentially of water vapor. In this respect, compound(s) other than water vapor and the at least one oxidizable component may be present in the gaseous feed in small amounts which are not sufficiently significant to derogate from the cost savings associated with using water vapor as a significant inert component of the gaseous feed, as well as derogate from the reducing atmosphere intended to be created within the first passage by introducing the gaseous feed to the first passage. Such compounds include reaction products which may be formed while the gaseous feed is being introduced to the first passage, including any non-oxidizable components formed during reformation of the at least one oxidizable component, as the gaseous feed is being flowed to the first passage during the introduction of the gaseous feed to the first passage. In one embodiment, the concentration of water vapor in the gaseous feed is greater than 50% by volume based on the total volume of the gaseous feed.

For safety considerations, the gaseous feed must be non-explosive at the temperature effective to facilitate deteriorative oxidation of the anode. In this respect, the concentration of the at least one oxidizable component of the gaseous feed is lower than the concentration necessary to render the gaseous feed, or the first gaseous stream, potentially explosive at these temperatures. For example, where the gaseous feed consists of water vapor and hydrogen, and where the temperature of the gaseous feed or the first gaseous stream is below the autoignition temperature for hydrogen (i.e. 590° C.), it would be prudent to maintain the hydrogen concentration in the gaseous feed below a concentration which, when mixed with an oxidizing agent source, such as air, forms a potentially explosive mixture. Such an upper concentration limit is known as the lower flammability limit. The flammability limits for hydrogen in air is 4.0% to 75% by volume, based on the total volume of the hydrogen-air mixture at ambient temperature and pressure. As such, a "safe" hydrogen concentration in the gaseous feed is 4.0% by volume, based on the total volume of the gaseous feed, acknowledging that a generous safety factor is built into this limiting safe concentration, as the hydrogen would only be further diluted upon mixing with air. In this respect, in some instances, higher hydrogen concentrations could be employed, such as 5% by volume, without compromising safety. Flammability limits are pressure and temperature dependent and can expand with an increase in pressure and/or temperature of the gaseous feed. As such, the "safe" hydrogen concentration in the gaseous feed can be lower than 4% by volume at pressures and/or temperatures higher than ambient.

The gaseous feed is introduced to the first passage, to produce a first gaseous stream flowing through the first passage, until a temperature is reached where it is safe to flow a gaseous fuel through the first passage. Below this threshold temperature, the gaseous fuel is potentially explosive. A gas explosion is generally defined as a process where combustion of a premixed gas, i.e. fuel-air or fuel-oxidizer, causes a rapid increase in pressure. Above this threshold temperature, the gaseous fuel burns without exploding. Where the gaseous fuel includes hydrogen at a concentration of over 4% by volume, based on the total volume of the fuel, and the anode comprises nickel, it is prudent to flow the first gaseous stream through the first passage when the temperature of the anode is above 400° C. in order to protect the anode from corrosion. It is unsafe to flow the gaseous fuel through the first passage at temperatures below the autoignition temperature of the gaseous fuel, because the gaseous fuel includes hydrogen at a concentration that could create a potentially explosive mixture. Where the temperature in the first passage is above the autoignition temperature of the gaseous fuel, it may be safe to flow the gaseous fuel through the first passage, without the risk of explosion. However, where anodes require protection from oxidation at temperatures below the autoignition temperature, it is necessary to flow a first gaseous stream deriving from the gaseous feed, instead of the gaseous fuel, through the first passage, to avoid potentially explosive conditions.

A gaseous fuel is defined as a substance or a mixture of substances in the form of gaseous or gaseous vapors that can undergo oxidation by reacting directly or indirectly (e.g., in an electrochemical cell) with oxygen, with concomitant production of thermal or electrical energy. With reference to the operation of solid oxide fuel cells, the defining feature of the gaseous fuel is the form under which the substance or the mixture of substances undergo oxidation, and particularly the form in which the substance or mixture of substances react at the fuel cell anode to produce electrical energy, and not the form of the substance or mixture of substances that are fed to the fuel cell system and result in the particular gaseous fuel composition being present in the fuel cell stack and undergoing oxidation at the fuel cell anodes. Thus, for example, with the primary fuel being liquid hydrocarbon or liquid mixture of hydrocarbons such as gasoline, naphtha or diesel fuel, the ultimate substance or mixture of substances being oxidized in the fuel cell stack and reacting at the anode are gaseous phases formed by evaporation or chemical conversion of the primary liquid fuel.

In one embodiment, a gaseous feed is introduced to the first passage, wherein the gaseous feed consists of methanol and a remainder, wherein the remainder consists essentially of water vapor. The concentration of methanol in the gaseous feed is insufficient to render the first gaseous stream in the first passage a potentially explosive mixture. In this respect, it is prudent to maintain the methanol concentration below that concentration which, when completely reformed into hydrogen, would produce a gaseous mixture whose hydrogen concentration is an acceptable hydrogen concentration, as explained above. Methanol is reformed to hydrogen, to some extent, as the gaseous feed is being produced by flash evaporation and being delivered to the first passage, and as the components of the gaseous feed and its reaction products pass through the first passage. In one embodiment, a reformer catalyst can be provided within the first passage, or an external feed conduit coupled to the first passage, to enhance methanol reformation. In one embodiment, and where a conservative system design is desired, it is preferred to assume that all of the methanol is reformed to hydrogen when attempting to determine a threshold methanol concentration.

For example, a gaseous feed comprising 2.4% methanol by weight, based on the total weight of the gaseous feed, when completely reformed, is transformed into a gaseous mixture comprising 4.0% hydrogen by volume, based on the total volume of the gaseous mixture (assuming that methanol is the only component of the initial gaseous feed that can be a source of hydrogen, upon reforming). As explained above, in one embodiment, when it is desired to operate with a safety margin, an acceptable threshold hydrogen concentration is 4.0% by volume at ambient pressure and temperature, based on the total volume of the gaseous mixture. Accordingly, an acceptable threshold methanol concentration in the gaseous feed, given this safety margin, is 2.4% by weight, based on the total weight of the gaseous feed, assuming all of the methanol is reformed into hydrogen. Of course, higher methanol concentrations may still be acceptable, depending on acceptable risk tolerances.

To form the first gaseous stream flowing through the first passage, the gaseous feed is produced and then introduced to the first passage. In this respect, in one embodiment, the gaseous feed is produced by an evaporator by way of flash evaporation of an aqueous solution comprising at least one oxidizable component and water. Where the at least one oxidizable component is a liquid hydrocarbon, the gaseous feed is generated from an evaporator by way of flash evaporation of an emulsion, preferably a stable emulsion, comprising an hydrocarbon and water. In one embodiment, the emulsion comprises diesel fuel in water. Aqueous solutions and aqueous emulsions are collectively referred to herein as "aqueous mixtures".

Flash evaporation facilitates simpler process control, as the composition of the gaseous feed is substantially the same as that of the starting aqueous mixture. Further, and in contrast with the slow boiling of a starting aqueous mixture, flash evaporation mitigates the consequences of initial generation of the gaseous feed enriched in the more volatile oxidizable component, which could increase the risk of explosion if the enrichment is significant. Infinitesimal enrichment of the at least one oxidizable component in the vapor phase is acceptable, so long as potentially explosive concentrations are not approached.

The gaseous feed can be produced by means other than flash evaporation of an aqueous mixture comprising an oxidizable component. For example, in the case of a gaseous feed consisting of water vapor and methanol, each of these gaseous components can be derived by separately evaporating these components in their pure liquid state, and then combining the resultant evaporated streams to achieve the desired concentration. As a further example, where the oxidizable component is hydrogen, this component can be derived by desorbing a metal hydride source of its adsorbed hydrogen constituent, or by directly adding gaseous hydrogen to the stream from a compressed gaseous feed cylinder.

In one embodiment, during start-up, the first passage is progressively heated. In this respect, the first passage can be heated internally by way of conduction, using an electric heater or combusting a fuel in a region proximate to the first passage. Alternatively, the gaseous feed can be heated externally of the solid oxide fuel cell, prior to its introduction into the first passage, or air can be heated externally of the solid oxide fuel cell, prior to its introduction to the second passage. When the temperature of the anode is above a temperature effective to cause oxidation of the anode, the gaseous feed is introduced to the first passage to form the first gaseous stream flowing through the first passage. Once the temperature within the first passage is sufficiently high such that the gaseous fuel is not potentially explosive when disposed in the first passage, the flow of the gaseous feed is terminated, and flow of gaseous fuel into the first passage is commenced. It is understood that the flow of the gaseous fuel can be commenced before the flow of the gaseous feed is terminated, so long as the temperature within the first passage is sufficiently high such that the gaseous fuel is not potentially explosive when disposed in the first passage. In this respect, in one embodiment, when the temperature of the first passage is sufficiently high, flow of the gaseous fuel through the first passage can be commenced, and progressively increased while the flow of the gaseous feed is progressively decreased and, eventually, terminated.

During start-up or shutdown conditions, a first gaseous stream comprising an oxidizable component, such as hydrogen, is flowed through the first passage, and small quantities of the first gaseous stream may leak from the first passage and into the second passage, thereby exposing the cathode to the first gaseous stream. Because the oxidizable component has a tendency to undergo oxidation, exposing the cathode to the first gaseous stream could promote reduction and, therefore, decomposition of the cathode. In order to mitigate cathode decomposition during start-up or shutdown conditions, it is desirable to flow a second gaseous stream through the second passage, and across the cathode, wherein the second gaseous stream includes a reducible component with a greater tendency to undergo reduction relative to the cathode.

In this respect, in another embodiment, and contemporaneously with the step of purging the first passage with the gaseous feed, a second gaseous stream is flowed through the second passage, wherein the second gaseous stream includes a reducible component with a greater tendency to undergo reduction relative to the cathode. The second gaseous stream can be flowed through the second passage of a fuel cell during start-up or shutdown conditions. Like the anode, the cathode is also susceptible to corrosion during start-up or shutdown conditions. In the case of the cathode, however, decomposition occurs at elevated temperatures when the cathode is exposed to a reducing atmosphere (i.e., the cathode is exposed to a gaseous feed, such as the first gaseous stream, which includes components which have a greater thermodynamic tendency to undergo oxidation, relative to the cathode, and thereby cause reduction of the cathode).

For instance, in one embodiment, the cathode comprises at least some oxides of lanthanum and other rare earth elements, magnesium, calcium and other alkaline earth elements, chromium, manganese, cobalt and nickel, preferably but not necessarily in the crystallographic form of perovskite (not all elements need to be present in the cathode composition, and some may be substituted by elements of similar chemical properties). An example of a suitable cathode material is lanthanum strontium manganate. In complementary relationship to the cathode material, a suitable second gaseous stream comprises air or another gaseous mixture containing oxygen in an amount adequate to prevent reduction of the cathode material caused by potential leakage of oxidizable components from the anode passages as well as any other reducing conditions encountered during operation of solid oxide fuel cell.

Figure 2:
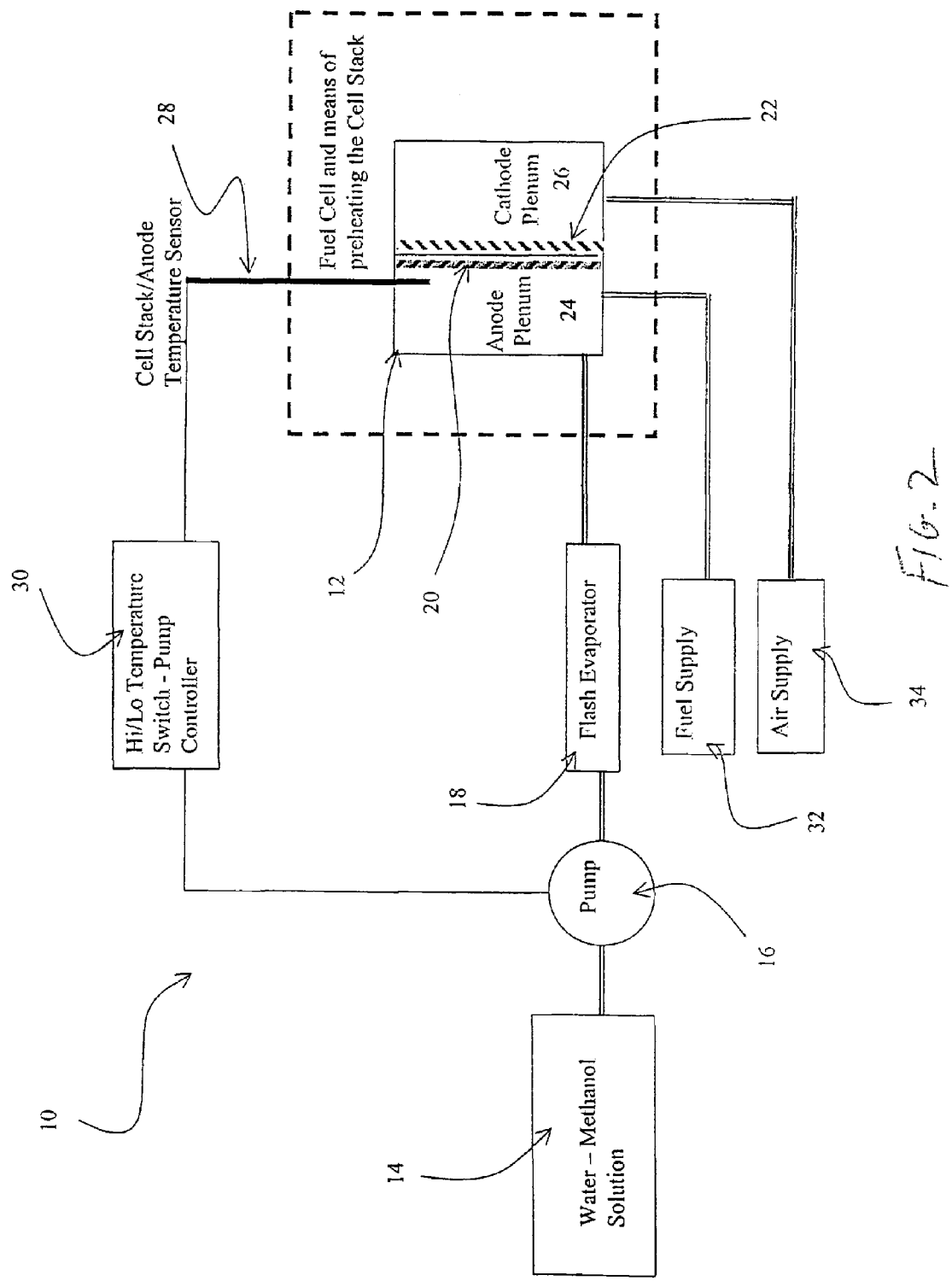
FIG. 2 is a schematic illustration of an embodiment of the fuel cell system of the present invention.

FIG. 2 is a schematic illustration of a system 10, according to the present invention. The system 10 includes a fuel cell 12, a storage vessel 14, a pump 16 and a flash evaporator 18. The fuel cell 12 includes an anode 20, and a cathode 22. The anode 20 is disposed in a first passage 24, and the cathode 22 is disposed in the second passage 26. The first passage 24 is coupled to a fuel supply 32, and the second passage is coupled to an air supply 34.

The storage vessel 14 contains an aqueous mixture including the at least one oxidizable component. The pump 16 is coupled to the storage vessel 14 and delivers the aqueous mixture to the flash evaporator 18. The flash evaporator 18 effects flash evaporation of the aqueous mixture delivered by the pump to produce gaseous feed that flows to and is thereby introduced to the first passage 24. Upon introduction to the first passage 24, the gaseous feed forms a first gaseous stream flowing through the first passage 24 and which is effective in mitigating decomposition of the anode 20 upon the anode 20 realizing a predetermined temperature.

During start-up, the fuel cell 12, including the first passage 24, is heated. Heat may be applied by way of conduction, using an electric heater or combusting a fuel in a region proximate to the fuel cell 12, and including the first passage 24. Alternatively, the gaseous feed can be heated externally of the fuel cell 12, prior to its introduction into the first passage 24, or air can be heated externally of the fuel cell 12 prior to its introduction to the second passage 26.

The system 10 also includes a temperature sensor 28 for sensing a temperature representative of the temperature of the anode 20. The temperature sensor 28 is connected to a controller 30, such as in this case a pump controller, and is configured to transmit a signal representative of the temperature of the anode 20 to the controller 30.

The controller 30 is configured to actuate operation of the pump 16 during start-up, upon receiving a signal from the temperature sensor 28 indicative of a first predetermined low temperature level. The first predetermined low temperature level is a temperature at which it is desirable to flow a gaseous feed through the first passage, to mitigate deteriorative oxidation of the anode. The role of the gaseous feed during start-up is to mitigate or prevent oxidation of the anode 20 and is also to mitigate or prevent the formation of explosive fuel-air gas mixtures in the fuel cell by purging air from the first passage 24.

Upon further heating of the fuel cell 12, the first predetermined high temperature level is eventually encountered and defines the temperature at which the gaseous fuel can be safely supplied to the fuel cell 12 without the risk of explosion. After reaching the first predetermined high temperature level, the flow of the gaseous fuel is commenced through the first passage. After introducing the flow of the gaseous fuel at a rate sufficient to scavenge oxygen which may leak or diffuse into the anode compartment, the flow of gaseous feed gas is no longer required for the purpose of protecting the anode 20 from deteriorative oxidation. In one embodiment, the operation of the pump 16 is stopped. Alternatively, in another embodiment, and depending on the requirements of the particular fuel cell 12, it may be preferable to gradually replace the gaseous feed flow with fuel flow by simultaneously decreasing the rate of discharge from the pump 16 and progressively increasing the fuel flow, or commencing fuel flow prior to stopping operation of the pump 16.

Where the fuel cell 12 uses integrated fuel reformers (such as those described in U.S. Pat. Nos. 4,395,468 and 4,374,184), an addition of steam to the fuel may be required during the period immediately after the commencement of fuel flow, or during other periods of fuel cell operation for purposes of reforming the fuel. In fuel cells using integrated reformers, the exhaust is recirculated to provide a source of oxygen containing species to the reformers. During start-up or during periods when the current generated is low in comparison with the fuel supply rate, stack exhaust is insufficiently oxidized. In this respect, in another embodiment, the purge gas may be used to supply the fuel cell 12 with the required steam. As one variation, the purge gas delivery system can be used to supply substantially pure steam by replacing the aqueous mixture in the supply tank 14 with pure water.

The gaseous feed flow can also be used during fuel cell shutdown. The role of the gaseous feed flow is to protect the anode 20 from deteriorate oxidation and also to remove the remnants of the previously supplied fuel from the fuel cell 12 to mitigate the risk of explosion. The gaseous feed is supplied to the first passage 24 immediately after the supply of fuel is terminated or in anticipation of an imminent fuel supply shortage. In this respect, during shutdown, and in concert with sensing termination of fuel flow or anticipated low fuel flow, the controller 30 is configured to actuate operation of the pump 16 upon receiving a signal from the temperature sensor 28 indicative of a second predetermined high temperature level, at which it is desirable to cease flow of the fuel (as the risk of explosion is unacceptable) and commence flow of the gaseous feed. During shutdown, the controller 30 is also configured to stop operation of the pump 16 upon receiving a signal from the temperature sensor 28 indicative of a second predetermined low temperature level, at which flow of the gaseous feed is unnecessary as deteriorative oxidation of the anode 20 is not of concern.

The present invention will be further described with reference to the following non-limitative examples.

EXAMPLE NO. 1

A planar solid oxide fuel cell supplied by InDEC b.v. (P.O. Box 1, 1755 ZG PETTEN, The Netherlands) of the "anode supported" type (the thickest and structural layer being the anode) was held at 800° C. in an atmosphere of air at the cathode side and gaseous feed mixture of 3% hydrogen in nitrogen at the anode side. The anode side $N_2$—$H_2$ gaseous feed mixture was then replaced with a mixture of steam and methanol vapors formed by flash evaporation of 3-weight % solution of methanol in water. The temperature of the cell was maintained at 800° C. for several hours, and then allowed to gradually cool to room temperature with the anode remaining in the steam-methanol vapors atmosphere, while at the temperature above 400° C. The following observations were made:

(1) The cell voltage in the presence of steam-methanol mix that was measured for the cell at the temperature above 400° C. remained substantially higher than the cell voltage corresponding to the conditions of anode oxidation. This indicated good protective properties of the gaseous feed mixture.

(2) After cooling down to room temperature, the cell did not show any sign of anode oxidation or degradation that could be associated with an oxidation of anode. Results of similar tests carried out on other cells without the presence of protective atmosphere (such as nitrogen-3% hydrogen) showed a significant level of anode damage most often leading to mechanical disintegration of the cell.

EXAMPLE NO. 2

A tubular solid oxide fuel cell as manufactured by Siemens Westinghouse Power Corporation (1310 Beulah Road, Pittsburgh Pa., 15235-5098) was operated at around 1000° C. in an atmosphere of air at the cathode side and gaseous fuel mixture containing 11% of water vapors in hydrogen at the anode side. The electrochemical discharge of the cell was then terminated and the cell brought to open-circuit conditions. The anode side $H_2$—$H_2O$ gaseous feed mixture was replaced with a mixture of steam and ethanol vapors produced by flash evaporation of 0.6-mol/liter solution of ethanol in water. The cell was allowed to cool under the purge of the steam-ethanol vapor mixture. The subsequent analysis did not indicate any sign of oxidation damage to the anode or to the cell.

Although the disclosure describes and illustrates preferred embodiments of the invention, it is to be understood that the invention is not limited to these particular embodiments. Many variations and modifications may occur to those skilled in the art within the scope of the invention. For definition of the invention, reference is to be made to the appended claims.

The invention claimed is:

1. A method of operating a fuel cell including an anode, a cathode, a first passage, and a second passage, wherein the anode is disposed in the first passage and the cathode is disposed in the second passage, comprising:
   (i) producing a non-explosive gaseous feed consisting of
      (i) at least one oxidizable component having a greater tendency to undergo oxidation relative to the anode, and (ii) a remainder, wherein the remainder is the predominant component in the gaseous feed and consists essentially of water vapor; and
   (ii) introducing the non-explosive gaseous feed to the first passage to form a first gaseous stream flowing through the first passage when the anode realizes a temperature effective to facilitate deteriorative oxidation of the anode in the presence of an oxidizing agent.

2. The method as claimed in claim 1, wherein the concentration of the water vapor in the gaseous feed is greater than 50% by volume based on the total volume of the gaseous feed.

3. The method as claimed in claim 2, wherein the concentration of the at least one oxidizable component is less than the minimum concentration necessary to render the gaseous feed potentially explosive at the effective temperature.

4. The method as claimed in claim 2, wherein the concentration of the at least one oxidizable component is less than the lower flammability limit of the at least one oxidizable component.

5. The method as claimed in claim 2, wherein the concentration of the at least one oxidizable component is effective to mitigate deteriorative oxidation of the anode.

6. The method as claimed in claim 5, wherein the concentration of the at least one oxidizable component is effective to substantially prevent deteriorative oxidation of the anode.

7. The method as claimed in claim 6, wherein the at least one oxidizable component is selected from the group consisting of hydrogen, alcohols, aldehydes, ketones, esters, organic acids, ammonia, hydrazine, and hydrocarbons.

8. The method as claimed in claim 7, further comprising evaporating an aqueous mixture consisting essentially of water and the at least one oxidizable component to produce the gaseous feed.

9. The method as claimed in claim 8, wherein the anode comprises nickel.

10. The method as claimed in claim 9, wherein the effective temperature is 400° C.

11. The method as claimed in claim 10, further comprising flowing a second gaseous stream through the second passage, the second gaseous stream including oxygen, while contemporaneously flowing the first gaseous stream through the first passage.

12. The method as claimed in claim 11, wherein the at least one oxidizable component is methanol and the concentration of methanol in the aqueous solution is less than about 2.4% by weight based on the total weight of the aqueous solution.

13. The method as claimed in claim 1, wherein the anode is heated from temperatures lower than the effective temperature to the effective temperature.

14. The method as claimed in claim 1, wherein, below the effective temperature, the anode does not realize deteriorative oxidation in the presence of an oxidizing agent.

15. A method of operating a fuel cell including an anode, a cathode, a first passage, and a second passage, wherein the anode is disposed in the first passage and the cathode is disposed in the second passage, comprising:
producing a non-explosive gaseous feed consisting of (i) at least one oxidizable component having a greater tendency to undergo oxidation relative to the anode, and (ii) a remainder, wherein the remainder is the predominant component in the gaseous feed and consists essentially of water vapor;
introducing the non-explosive gaseous feed to the first passage to form a first gaseous stream flowing through the first passage when the anode realizes a temperature effective to facilitate deteriorative oxidation of the anode in the presence of an oxidizing agent; and
evaporating an aqueous mixture consisting essentially of water and the at least one oxidizable component to produce the gaseous feed.

16. The method as claimed in claim 15, wherein the concentration of the water vapor in the gaseous feed is greater than 50% by volume based on the total volume of the gaseous feed.

17. The method as claimed in claim 16, wherein the concentration of the at least one oxidizable component is less than the minimum concentration necessary to render the gaseous feed potentially explosive at the effective temperature.

18. The method as claimed in claim 16, wherein the concentration of the at least one oxidizable component is less than the lower flammability limit of the at least one oxidizable component.

19. The method as claimed in claim 16, wherein the concentration of the at least one oxidizable component is effective to mitigate deteriorative oxidation of the anode.

20. The method as claimed in claim 19, wherein the concentration of the at least one oxidizable component is effective to substantially prevent deteriorative oxidation of the anode.

21. The method as claimed in claim 20, wherein the at least one oxidizable component is selected from the group consisting of hydrogen, alcohols, aldehydes, ketones, esters, organic acids, ammonia, hydrazine, and hydrocarbons.

22. The method as claimed in claim 15, wherein the anode comprises nickel.

23. The method as claimed in claim 22, wherein the effective temperature is 400° C.

24. The method as claimed in claim 23, further comprising flowing a second gaseous stream through the second passage, the second gaseous stream including oxygen, while contemporaneously flowing the first gaseous stream through the first passage.

25. The method as claimed in claim 24, wherein the at least one oxidizable component is methanol and the concentration of methanol in the aqueous solution is less than about 2.4% by weight based on the total weight of the aqueous solution.

26. The method as claimed in claim 15, wherein the anode is heated from temperatures lower than the effective temperature to the effective temperature.

27. The method as claimed in claim 15, wherein, below the effective temperature, the anode does not realize deteriorative oxidation in the presence of an oxidizing agent.

28. A method of operating a fuel cell including an anode, a cathode, a first passage, and a second passage, wherein the anode is disposed in the first passage and the cathode is disposed in the second passage, comprising:
producing a non-explosive gaseous feed consisting of (i) at least one oxidizable component having a greater tendency to undergo oxidation relative to the anode, and (ii) a remainder, wherein the remainder is the predominant component in the gaseous feed and consists essentially of water vapor;
introducing the non-explosive gaseous feed to the first passage to form a first gaseous stream flowing through the first passage when the anode realizes a temperature effective to facilitate deteriorative oxidation of the anode in the presence of an oxidizing agent; and
evaporating an aqueous mixture consisting essentially of water and the at least one oxidizable component to produce the gaseous feed;
wherein the at least one oxidizable component is selected from the group consisting of hydrogen, alcohols, aldehydes, ketones, esters, organic acids, ammonia, hydrazine, and hydrocarbons;
wherein the concentration of the at least one oxidizable component is effective to substantially prevent deteriorative oxidation of the anode;
wherein the concentration of the at least one oxidizable component is effective to mitigate deteriorative oxidation of the anode; and
wherein the concentration of the water vapor in the gaseous feed is greater than 50% by volume based on the total volume of the gaseous feed.

29. The method as claimed in claim 28, wherein the anode comprises nickel.

30. The method as claimed in claim 29, wherein the effective temperature is 400° C.

31. The method as claimed in claim 30, further comprising flowing a second gaseous stream through the second passage, the second gaseous stream including oxygen, while contemporaneously flowing the first gaseous stream through the first passage.

32. The method as claimed in claim 31, wherein the at least one oxidizable component is methanol and the concentration of methanol in the aqueous solution is less than about 2.4% by weight based on the total weight of the aqueous solution.

* * * * *